United States Patent
Hiraiwa

(10) Patent No.: US 7,429,228 B2
(45) Date of Patent: Sep. 30, 2008

(54) MULTI-SPEED AUTOMATIC TRANSMISSION FOR MOTOR VEHICLE

(76) Inventor: Kazuyoshi Hiraiwa, 6-5-8, Tomioka-Nishi, Kanazawa-Ku, Yokohama (JP)

( * ) Notice: Subject to any disclaimer, the term of this patent is extended or adjusted under 35 U.S.C. 154(b) by 243 days.

(21) Appl. No.: 11/499,793

(22) Filed: Aug. 7, 2006

(65) Prior Publication Data
US 2008/0032845 A1    Feb. 7, 2008

(51) Int. Cl.
*F16H 37/02* (2006.01)
*F16H 3/44* (2006.01)

(52) U.S. Cl. .......... 475/219; 475/285; 475/324

(58) Field of Classification Search ........ 475/330, 475/207, 218, 219, 221, 284, 285, 311, 323, 475/324, 903; 74/331
See application file for complete search history.

(56) References Cited

U.S. PATENT DOCUMENTS
6,558,283 B1 * 5/2003 Schnelle .............. 475/5

FOREIGN PATENT DOCUMENTS
JP    2004219553    * 10/1992
JP    2005180665    * 7/2005

* cited by examiner

*Primary Examiner*—Roger Pang

(57) ABSTRACT

A multi-speed automatic transmission includes an input shaft, a first out put shaft having a first planetary gear set, and a second output shaft having a second planetary gear set. The shafts are in parallel with one another. The input shaft is engageable with the first ring gear and the second carrier. The first output shaft is engageable with the first carrier. The second output shaft is engageable with the second ring gear. The first and the second sun gears are engaged with an intermediate gear which can be held to a transmission case by a first brake arranged between the intermediate gear and the first and second planetary gear sets, and being connectable with the input shaft via the input drive gear and the first input driven gear. The second carrier can be held to the transmission case.

5 Claims, 6 Drawing Sheets

FIG. 4

|   |     | C-1 | C-2 | C-3 | C-4 | B-1 | B-2 | OC |
|---|-----|-----|-----|-----|-----|-----|-----|----|
| D | 1st | ◎ | ○ |   |   |   |   | ○ |
|   | 2nd | ○ | ○ |   |   | ○ |   |   |
|   | 3rd | ○ | ○ | ○ |   |   |   |   |
|   | 4th | ○ | ○ |   | ○ |   |   |   |
|   | 5th |   | ○ | ○ | ○ |   |   |   |
|   | 6th | ○ |   | ○ | ○ |   |   |   |
|   | 7th | (○) |   |   | ○ | ○ |   |   |
| R | Rev | ◎ |   | ○ |   |   | ○ |   |
| L | 1st | ◎ | ○ |   |   |   | ○ |   |

FIG. 6

|   |     | C-1 | C-2 | C-3 | C-4 | B-1 | B-2 | OC |
|---|-----|-----|-----|-----|-----|-----|-----|----|
| D | 1st | M   | ○   |     |     |     |     | ○  |
|   | 2nd | ○   | ○   |     |     | ○   |     |    |
|   | 3rd | ○   | ○   | ○   |     |     |     |    |
|   | 4th | ○   | ○   |     | ○   |     |     |    |
|   | 5th |     | ○   | ○   | ○   |     |     |    |
|   | 6th | ○   |     | ○   | ○   |     |     |    |
|   | 7th | (○) |     |     | ○   | ○   |     |    |
| R | Rev | M   |     | ○   |     |     | ○   |    |
| L | 1st | M   | ○   |     |     |     | ○   |    |

MULTI-SPEED AUTOMATIC TRANSMISSION FOR MOTOR VEHICLE

BACKGROUND OF THE INVENTION

1. Field of the Invention

The present invention relates to a multi-speed automatic transmission for a motor vehicle in which the automatic transmission is arranged in a lateral direction of its vehicle body.

2. Description of the Related Art

Recently, automatic transmissions mounted on motor vehicles require more forward speed, for example more than 5-speeds, in order to improve fuel consumption, exhaust emission purification, and accelerating performance. Such a conventional multi-speed automatic transmission for a motor vehicle is disclosed in Japanese patent laid-open publication No. (Tokkaihei) 04-219553. This conventional multi-speed automatic transmission has two gear sets, one of which is a Ravigneaux type planetary gear set, or three gear sets associated with five friction elements to provide forward 6-speeds. These gear sets and friction elements are arranged in series in an axial direction of the transmission, so that it requires space longer in the axial direction for its installation on a motor vehicle, causing great difficulties in mounting it on a vehicle body, of a front-engine front-drive (FF) vehicle and a rear-engine rear-drive (RR) vehicle for example, in which the transmission is arranged in a lateral direction of the vehicle body.

In order to avoid such a disadvantage, another conventional multi-speed automatic transmission has been proposed, and disclosed in Japanese patent laid-open publication No. 2005-180665. This transmission has two planetary gear sets and five to six friction elements, the planetary gear sets and the friction elements being separated into two groups and arranged on two parallel shafts, respectively.

The above known conventional multi-speed automatic transmission, however, encounters such the following problem. Although the latter conventional automatic transmission can be shorten in its axial direction in comparison with the former conventional automatic transmission, it can not avoid arrangement of four friction elements, consisting of two clutches and two brakes, in series on an axis of one of the planetary gear set. Especially, one brake can not avoid being arranged at an outer side of a chain connecting the first and second planetary gear sets. This requires further improvement in decreasing its axial directional length in order to install the automatic transmission on a smaller vehicle.

It is, therefore, an object of the present invention to provide a multi-speed automatic transmission for a motor vehicle which overcomes the foregoing drawbacks and can decrease an axial length of the automatic transmission for easily installing it on a smaller vehicle.

SUMMARY OF THE INVENTION

According to the first aspect of the present invention there is provided a multi-speed automatic transmission for a motor vehicle including a transmission case, an input shaft having an input drive gear, a first out put shaft having a first output drive gear at an one end portion thereof and arranged in parallel with the input shaft, a second output shaft having a second output drive gear and arranged in parallel with the input shaft and the first output shaft, a first input driven gear rotatable on the first output shaft and engaging with the input drive gear, a second input driven gear rotatable on the second output shaft and engaging with the first dive gear, an output driven gear in mesh with the first output drive gear and the second output drive gear, a first planetary gear set interposed between the input shaft and the first output drive gear and arranged in coaxial with the first output shaft to change a rotational speed of the input shaft to a rotational speed of the first output drive gear, the first planetary gear set including a first sun gear, a first ring gear, a plurality of first pinions supported by a first pinion carrier and engaging with the first sun gear and the first ring gear, and a second planetary gear set interposed between the input shaft and the second output drive gear and arranged in coaxial with the second output shaft to change the rotational speed of the input shaft to a rotational speed of the second output drive gear, the second planetary gear set including a second sun gear, a second ring gear, a plurality of second pinions supported by a second pinion carrier and engaging with the second sun gear and the second ring gear. The input shaft is in one of engaging and engageable relationships with the first ring gear via the input drive gear and the first input driven gear, and is in one of engaging and engageable relationships with the second carrier via the input drive gear and the second input driven gear. The first output shaft is in one of engaging and engageable relationships with the first carrier. The second output shaft is in one of engaging and engageable relationships with the second ring gear. The first sun gear and the second sun gear are engaged with an intermediate gear, being capable of being held to the transmission case by a first brake arranged between the intermediate gear and the first and second planetary gear sets, and being connectable with the input shaft via the input drive gear and the first input driven gear. The second carrier is capable of being held to the transmission case.

Therefore, the multi-speed automatic transmission can further decrease its axial length, thereby enabling it to be installed on a smaller motor vehicle.

Preferably, the first input driven gear and the first ring gear are connectable with each other by engaging a first clutch and a second clutch. The first ring gear and the first sun gear are connectable with each other by engaging the second clutch and a third clutch. The first sun gear is connectable with the first input driven gear by engaging the first and third clutches. The second input driven gear and the second carrier are connectable with each other by engaging a fourth clutch. The second carrier is capable of being held to the transmission case by a second brake.

Therefore, the multi-speed automatic transmission can obtain 7 speeds by using only five friction elements or six friction elements adding a one-way clutch.

Preferably, the first clutch acts as a moving-off element.

Therefore, the multi-speed automatic transmission can remove a fluid coupling and a torque converter, which can further decrease its axial length.

Preferably, the first clutch, the second clutch and the third clutch are connected by an intermediate member arranged in coaxial with the first output shaft.

Therefore, the first to third clutches are arranged in compact, and can be made at low manufacturing costs and manufacturing process.

BRIEF DESCRIPTION OF THE DRAWINGS

The objects, features and advantages of the present invention will become apparent as the description proceeds when taken in conjunction with the accompanying drawings, in which:

FIG. 4 is a shift table of a relationship between states of friction elements and gears established thereby in the automatic transmission shown in FIG. 1;

FIG. 6 is a shift table of a relationship between states of friction elements and gears established thereby in the automatic transmission shown in FIG. 5.

DESCRIPTION OF THE PREFERRED EMBODIMENTS

Figure 1:
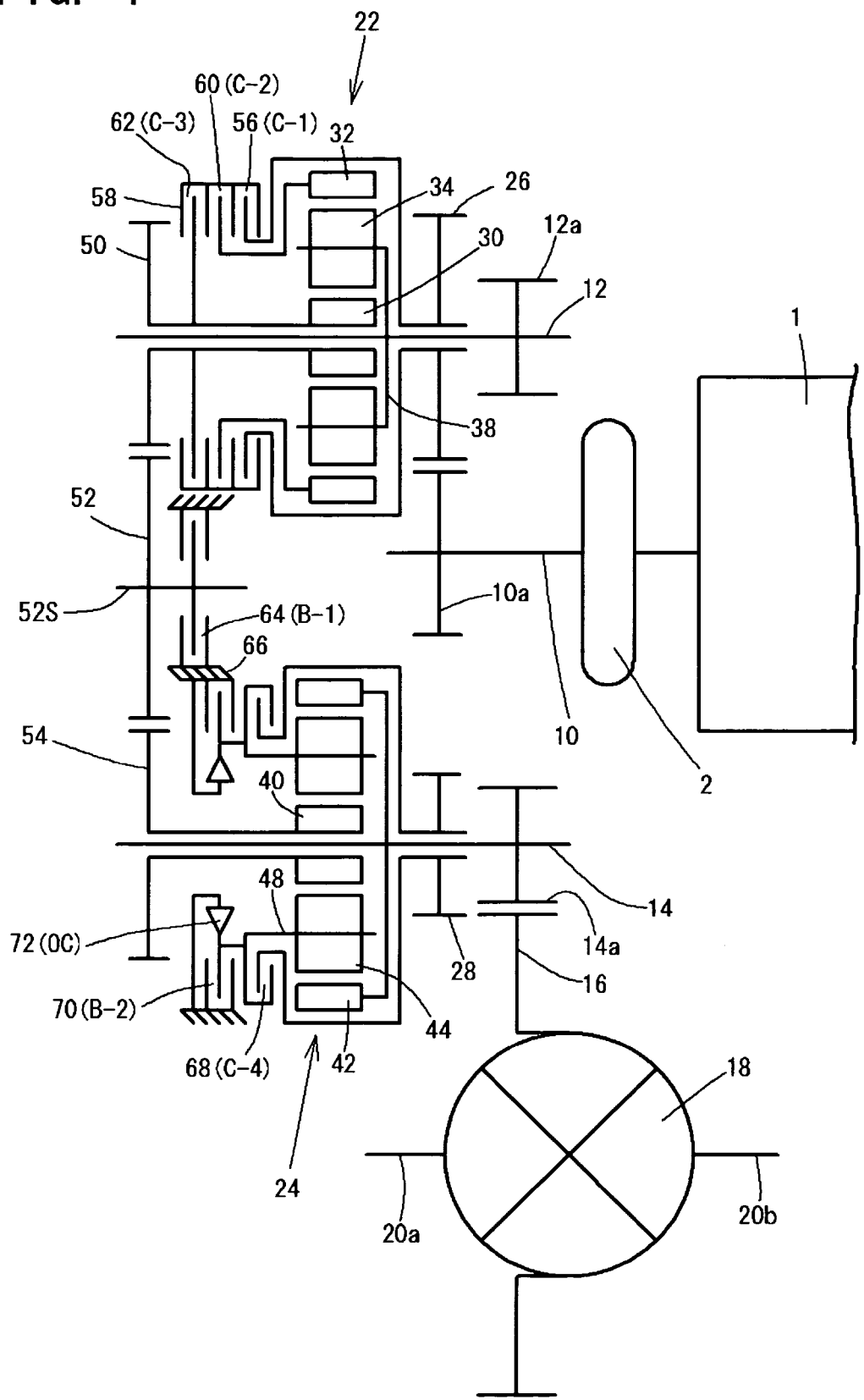
FIG. 1 is a skeleton diagram showing a gear train of a multi-speed automatic transmission of a first preferred embodiment according to the present invention.

Throughout the following detailed description, similar reference characters and numbers refer to similar elements in all figures of the drawings.

A 7-speed automatic transmission for a motor vehicle of a first preferred embodiment according to the present invention will be described with reference to the accompanying drawings.

Figure 2:
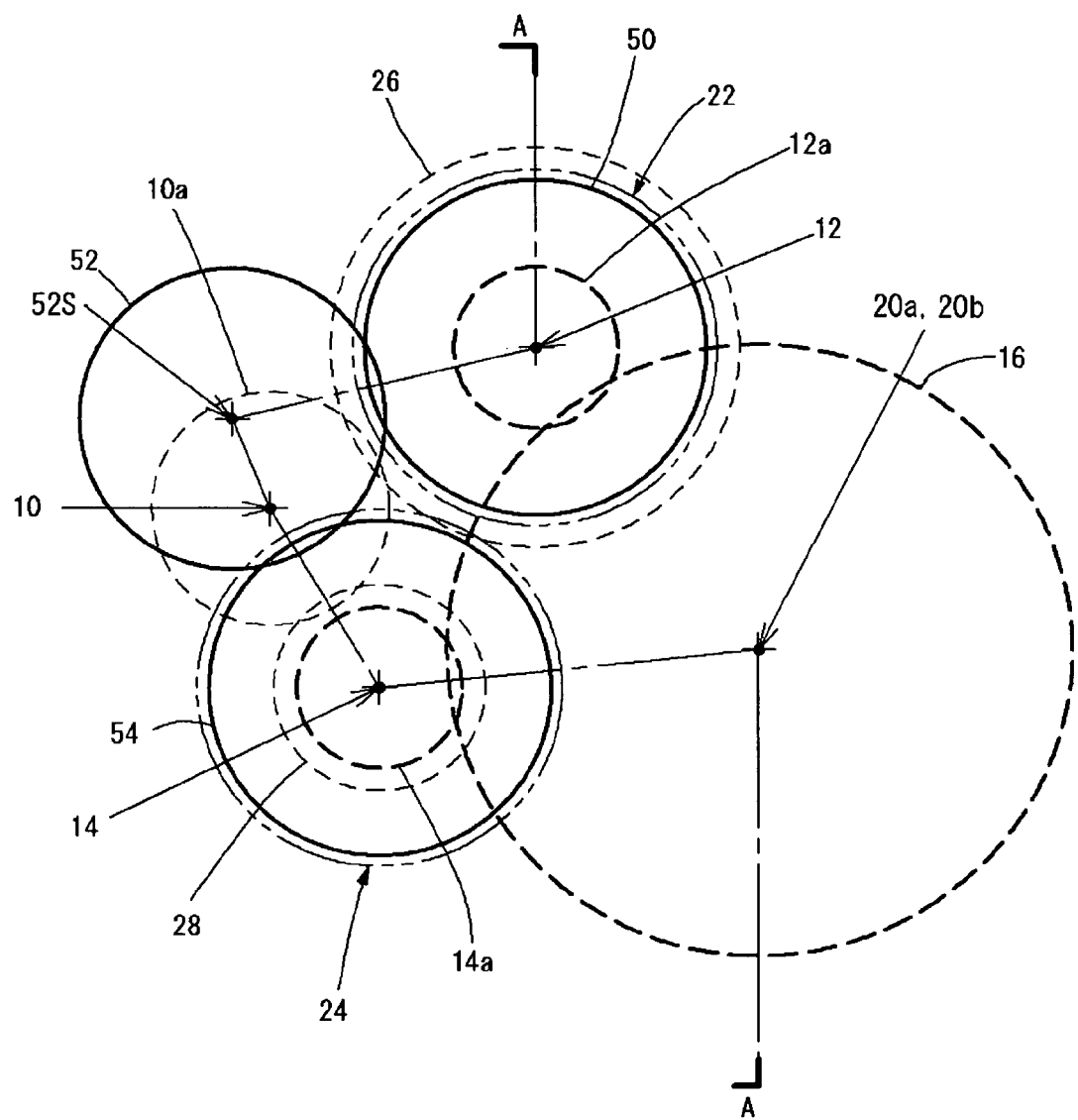
FIG. 2 is a diagram showing arrangement of gears and shafts used in the gear train of the multi-speed automatic transmission of the first embodiment shown in FIG. 1.
Figure 3:
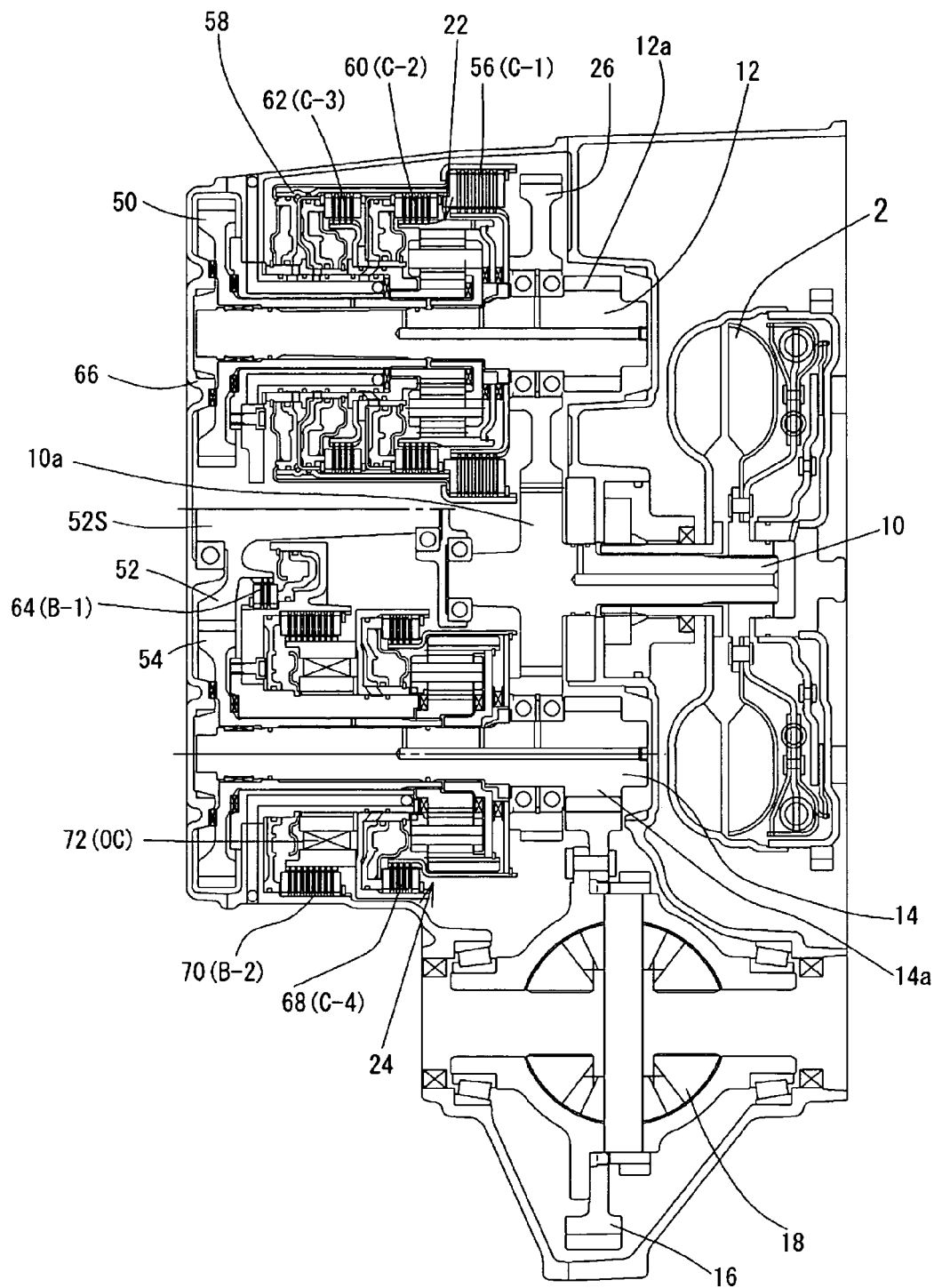
FIG. 3 is a sectional view of the multi-speed automatic transmission of the first embodiment shown in FIG. 1.

As shown in FIGS. 1 to 3, the 7-speed automatic transmission is equipped with an input shaft 10, a first output shaft 12, a second output shaft 14, a first planetary gear set 22, and a second planetary gear set 24, and is mounted on a not-shown vehicle body so that the shafts 10, 12 and 14 are arranged in parallel with one another and in a lateral direction of the vehicle body when the automatic transmission is mounted on the vehicle body.

The input shaft 10 is arranged in coaxial with a crank shaft of an internal combustion engine 1 and connected at its one end portion with the engine 1 via a fluid coupling 2, being integrally fixed at its other end portion with an input drive gear 10a.

The input drive gear 10a is in mesh with a first input driven gear 26 and a second input driven gear 28. The first input driven gear 26 is relatively rotatable on the first output shaft 12 via not-shown bearings. The input drive gear 10a and the first input driven gear 28 act as a first input gear set of the present invention. The second input driven gear 28 is illustrated in FIG. 1 as though it were apart from the input drive gear 10a, not meshing therewith, but in actual they are meshed with each other as shown in FIG. 2. The input drive gear 10a and second input driven gear 28 act as a second input gear set of the present invention. The second input driven gear 28 is rotatable on the second output shaft 14 via not-shown bearings.

The first output shaft 12 is integrally connected at its one-end portion with a first output drive gear 12a, which is engaged with an output driven gear 16 as shown in FIG. 2, although they are illustrated as though they were not engaged with each other in FIG. 1.

The first output shaft 12 supports the first planetary gear set 22 so that they are arranged in coaxial with each other, and the second output shaft 14 supports the second planetary gear set 24 so that they are arranged in coaxial with each other.

The first planetary gear set 22 is a single pinion type one, and includes a first sun gear 30, a first ring gear 32, and a plurality of first pinions 34 rotatably supported by a first pinion carrier 38, where each of the first pinions 34 is arranged between the first sun gear 30 and the first ring gear 32, being meshed with them.

The first sun gear 30 is relatively rotatable on the first output shaft 12 and fixed with a first reaction gear 50 through a hollow shaft. The first sun gear 30 is connectable with the first input gear 26 by engaging both of a first clutch 56 and a third clutch 62 through an intermediate member 58 arranged in coaxial with the first output shaft, and also connectable with the first ring gear 32 by engaging both of the third clutch 62 and a second clutch 60 through the intermediate member 58.

The first ring gear 32 is arranged at an outer side of the first sun gear 30 and in coaxial with the first sun gear 30. The first ring gear 32 is connectable with the first sun gear 30 by engaging both of the first and third clutches 56 and 62 and also connectable with the first input gear 26 by engaging both of the first and second clutches 56 and 60. The first clutch 56, the second clutch 60, and the third clutch 62 are arranged in series in the axial direction of the automatic transmission, where friction discs of the first and second clutches 56 and 60 are mounted on an outer peripheral portion of the first planetary gear set 22 and friction discs of the third clutch 62 are located between the first planetary gear set 22 and the first reaction gear 50. Pistons of the first to third clutches 56, 60 and 62 are also disposed between the first planetary gear set 22 and the first reaction gear 50.

The first pinion carrier 38 is integrally connected with an intermediate portion of the first output shaft 12 at a position between the first sun gear 30 and the first input driven gear 26.

The second planetary gear set 24 is a single pinion type one, and includes a second sun gear 40, a second ring gear 42, and a plurality of second pinions 44 rotatably supported by a second pinion carrier 48, where each of the second pinions 44 is arranged between the second sun gear 40 and the second ring gear 42, being meshed with them.

The second sun gear 40 is relatively rotatable on the second output shaft 14 and fixed with a second reaction gear 54 through a hollow shaft. The second reaction gear 54 and the first reaction gear 50 are connected with each other via an intermediate gear 52, so that the first and second sun gears 30 and 40 are connected with each other via the first reaction gear 50, the intermediate gear 52 and the second reaction gear 54. The intermediate gear 52 can be held to a transmission case 66 by applying a first brake 64, so that the first brake 64 is capable of stopping the first and second sun gear 30 and 40 at the same time. The first brake 64 is located in coaxial with an intermediate gear shaft 52S of the intermediate gear 52 and between the intermediate gear 52 and the first and second planetary gear sets 22 and 24 in the axial direction.

The second ring gear 42 is arranged at an out side of the second sun gear 40 and in coaxial with the second sun gear 40. The second ring gear 42 is connected with an intermediate portion of the second output shaft 14 at a position between the second sun gear 40 and the second input driven gear 28.

The second pinion carrier 48 is connectable with the second input driven gear 28 by engaging a fourth clutch 68 and fixable to the transmission case 66 by applying a second brake 70. The second pinion carrier 48 is also fixable to the transmission case 66 by a one-way clutch, or an overrunning clutch, 72, being allowed to rotate in one direction but not in the other direction.

The second output shaft 14 is integrally connected with a second output drive gear 14a, which is meshed with the output driven gear 16. The output driven gear 16 is capable of driving a left drive shaft 20a and a right drive shaft 20b through differential gears 18 so that the left and right drive shafts 20a and 20b can drive a not-shown left front wheel and a not-shown right front wheel, respectively.

Friction elements, consisting of the first to third clutches 56, 60 and 62, and the first and second brake 64 and 70, are operated based on vehicle speed, an accelerator pedal angle, a select-lever position and others in order to obtain optimum gears according to a shift table shown in FIG. 4. The one-way clutch 72 is mechanically and automatically operated according to a rotation state of the second pinion carrier 44 also as shown in FIG. 4.

In the shift table of FIG. 4, "D", "R" and "L" indicate a forward drive position, a reverse position and a forward low drive position of the select lever position, respectively and "1st" to "7th" and "Rev" indicate first to seventh speeds and reverse speed, respectively. "C-1" to "C-3" indicates the first to third clutches 56, 60 and 62, respectively. "B-1", "B-2" and "OC" indicate the first brake 64, the second brake 70 and the one-way clutch 72. "○" indicates application, of the corresponding friction element, capable of transmitting torque, and "(○)" indicates application, of the corresponding friction element independent, of transmitting torque.

Hereinafter, a first ratio $\alpha 1$ of the first planetary gear set 22 is defined as (the number of teeth of the first sun gear 30)/(the number of teeth of the first ring gear 32), and a second ratio $\alpha 2$ of the second planetary gear set 24 is defined as (the number of teeth of the first sun gear 40)/(the number of teeth of the first ring gear 42). A first input ratio $i1$ is defined as (the number of teeth of the first input driven gear 26)/(the number of teeth of the input drive gear 10a), and a second input ratio $i2$ is defined as (the number of teeth of the second input driven gear 28)/(the number of teeth of the input drive gear 10a). In this embodiment, $\alpha 1$, $\alpha 2$, $i1$ and $i2$ are set to be 0.51, 0.59, 1.78, and 0.95, respectively, and a reaction ratio defined as (the number of teeth of the first reaction gear 50)/(the number of teeth of the second reaction gear 54) is set to be 1. This means that the first input driven gear 26 is driven by the input shaft 10 at a reduction ratio, and the second input driven gear 28 is driven by the input shaft 10 at an overdrive ratio. Incidentally, $\alpha 1 \cdot (1+\alpha 2)$ is described as AB in the following equations in order to simply describe an equation, and it becomes 0.811 in this embodiment.

In order to obtain a first forward gear in the D position, the first clutch 56 and the second clutch 60 are engaged to connect the first input driven gear 26 and the first ring gear 32 with each other. At the same time, the one way clutch 72 automatically holds the second pinion carrier 48 in a forward rotation direction, where the input shaft 10 can not be driven from the output gear 16 side, so that, what is called, engine braking can not be obtained. A first gear ratio is defined as (the rotation speed of the input shaft 10)/(the rotation speed of the first output shaft 12), and equal to $i1 \cdot (1+\alpha 1)+i1 \cdot \alpha 1/\alpha 2$. This ratio is 4.226 when $\alpha 1$, $\alpha 2$, $i1$ and $i2$ are set to have the values described above.

In order to obtain a second forward gear from the first forward gear in the D position, the first and second clutches 56 and 60 are kept being engaged similarly at the first forward gear, and the first brake 64 is applied to hold the first sun gear 30 and the second sun gear 40 to the transmission case 66. In this second gear, the one way clutch 72 is automatically released, so that the second pinion carrier 48 can be freely rotated relative to the transmission case 66. This can suppress shift shock from the first forward gear to the second forward gear, because its control can be performed only by controlling the first brake 64. This provides a second gear ratio equal to $i1 \cdot (1+\alpha 1)$. The second gear ratio is 2.688 when $\alpha 1$, $\alpha 2$, $i1$ and $i2$ are set to have the values described above.

In order to obtain a third forward gear from the second forward gear in the D position, the first and second clutches 56 and 60 are kept being engaged similarly at the second forward gear, the first brake 64 is released, and the third clutch 62 is engaged to connect the first ring gear 32 and the first sun gear 30 with each other. This makes the first planetary gear set 22 to rotate as one unit, thereby providing a third gear ratio equal to $i1$. Therefore, the third gear ratio is 1.780 when $\alpha 1$, $\alpha 2$, $i1$ and $i2$ are set to have the values described above.

In order to obtain a fourth forward gear from the third forward gear in the D position, the first and second clutches 56 and 60 are kept being engaged similarly at the third forward gear, the third clutch 62 is released and the fourth clutch 68 is engaged to connect the second sun gear 40 and the second input driven gear 28 with each other. Accordingly, the first sun gear 30, engaged with the second sun gear 40 via the intermediate gear 52, is also connected with the second input driven gear 28. This provides a fourth gear ratio equal to $i1 \cdot i2 \cdot (\alpha 2+AB)/(i2 \cdot i2+i1 \cdot AB)$. Therefore, the fourth gear ratio is 1.182 when $\alpha 1$, $\alpha 2$, $i1$ and $i2$ are set to have the values described above.

In order to obtain a fifth forward gear from the fourth forward gear in the D position, the second and fourth clutches 60 and 68 are kept being engaged similarly at the fourth forward gear, the first clutch 1 is released and the third clutch 62 is engaged to connect the first ring gear 32 and the first sun gear 30 with each other, so that the first planetary gear set 22 rotates as one unit, thereby causing the second planetary gear set 24 to rotate as one unit. This provides a fifth gear ratio equal to $i2$. The fifth gear ratio is 0.950, an overdrive gear ratio, when $\alpha 1$, $\alpha 2$, $i1$ and $i2$ are set to have the values described above.

In order to obtain a sixth forward gear from the fifth forward gear in the D position, the third and fourth clutches 62 and 68 are kept to be engaged similarly at the fifth forward gear, the second clutch 60 is released and the first clutch 56 is engaged to connect the first sun gear 30 and the first input driven gear 26 with each other. Accordingly, the rotational speed of the second sun gear 40 becomes $1/i1$ as well as the first sun gear 30. This provides a sixth gear ratio equal to $i1 \cdot i2/\{i1+\alpha 2 \cdot (i1-i2)\}$. The sixth gear ratio is 0.745 when $\alpha 1$, $\alpha 2$, $i1$ and $i2$ are set to have the values described above.

In order to obtain a seventh forward gear from the sixth forward gear in the D position, the first and fourth clutches 56 and 68 are kept being engaged similarly at the sixth forward gear, the third clutch 62 is released and the first brake 64 is applied, so that the first and second sun gears 30 and 40 are held to the transmission case 66. This provides a seventh gear ratio equal to $i2/(1+\alpha 2)$. The seventh gear ratio is 0.597 when $\alpha 1$, $\alpha 2$, $i1$ and $i2$ are set to have the values described above.

In order to obtain a reverse gear in the Reverse (R) position, the first and third clutches 56 and 62 are engaged and the second brake 70 is applied, so that the second sun gear 40 is connected with the first input driven gear 26, and the second pinion carrier 48 is held to the transmission case 66. Accordingly, the second sun gear 40 is driven at the rotational speed of $1/i1$. This provides a reverse gear ratio equal to $-i1/\alpha 2$. The reverse gear ratio is $-3.017$ in a reverse rotation direction when $\alpha 1$, $\alpha 2$, $i1$ and $i2$ are set to have the values described above.

In order to obtain a first forward gear in a LOW (L) position where the engine braking can provided, in addition to engagements of the first and second clutches 56 and 60 similarly at the first forward gear in the D position, the second brake 70 is applied, so that the second pinion carrier 48 is held to the transmission case 66. Accordingly, the output gear 16 can drive the input shaft 10 to be capable of applying the engine braking. This gear ratio has the same value as the first gear ratio in the D position.

This automatic transmission of the first embodiment can have gear ratios varying from 4.226 to 0.597, providing a wide gear ratio of 7.074, obtained by (the first gear ratio)/(the seventh gear ratio).

On the other hand, a gear step can be expressed as a ratio of adjacent gear ratios. In this embodiment, when α1, α2, i1 and i2 are set to have the values described above, a first-second gear step between the first gear ratio and the second gear ratio is 1.572, a second-third gear step between the second gear ratio and the third gear ratio is 1.510, a third-fourth gear step between the third gear ratio and the fourth gear ratio is 1.506, the fourth-fifth gear step between the fourth gear ratio and the fifth gear ratio is 1.244, a fifth-sixth gear step between the fifth gear ratio and the sixth gear ratio is 1.275, and a sixth-seventh gear step between the sixth gear ratio and the seventh gear ratio is 1.247.

These gear steps becomes smaller as its gear becomes higher, which gives preferable gear-ratio characteristics when a motor vehicle is propelled by an internal combustion engine.

The drive train of the first embodiment has the following advantages.

The first to third clutches 56, 60 and 62 are arranged in series in the axial direction, and the first brake 64 is arranged between the first and second reaction gears 50 and 54 and the first and second planetary gear sets 22 and 24 in the axial direction, because the first and second reaction gears 50 and 54 are engaged via the intermediate gear 52 engaged with the first and second sun gears 30 and 40, which can be stopped by the second brake 64. Therefore, the axial length of the drive train of the first embodiment can be decreased, thereby enabling the automatic transmission of smaller FF and RR vehicles to be easily installed.

Incidentally, the gear ratio between the first and second reaction gears 50 and 54 is set to be 1 in this embodiment, but it may be set to have a reduction ratio or an overdrive ratio.

The first clutch 56 may be removed so that the first input driven gear 26 can be connected with the first ring gear 32 by applying only the second clutch 60 and also connected with the first sun gear 30 by applying only the third clutch 62, which can provide a six-speed automatic transmission.

Next, a 7-speed automatic transmission for a motor vehicle of a second embodiment according to the present invention will be described with respect to the accompanying drawings.

Figure 5:
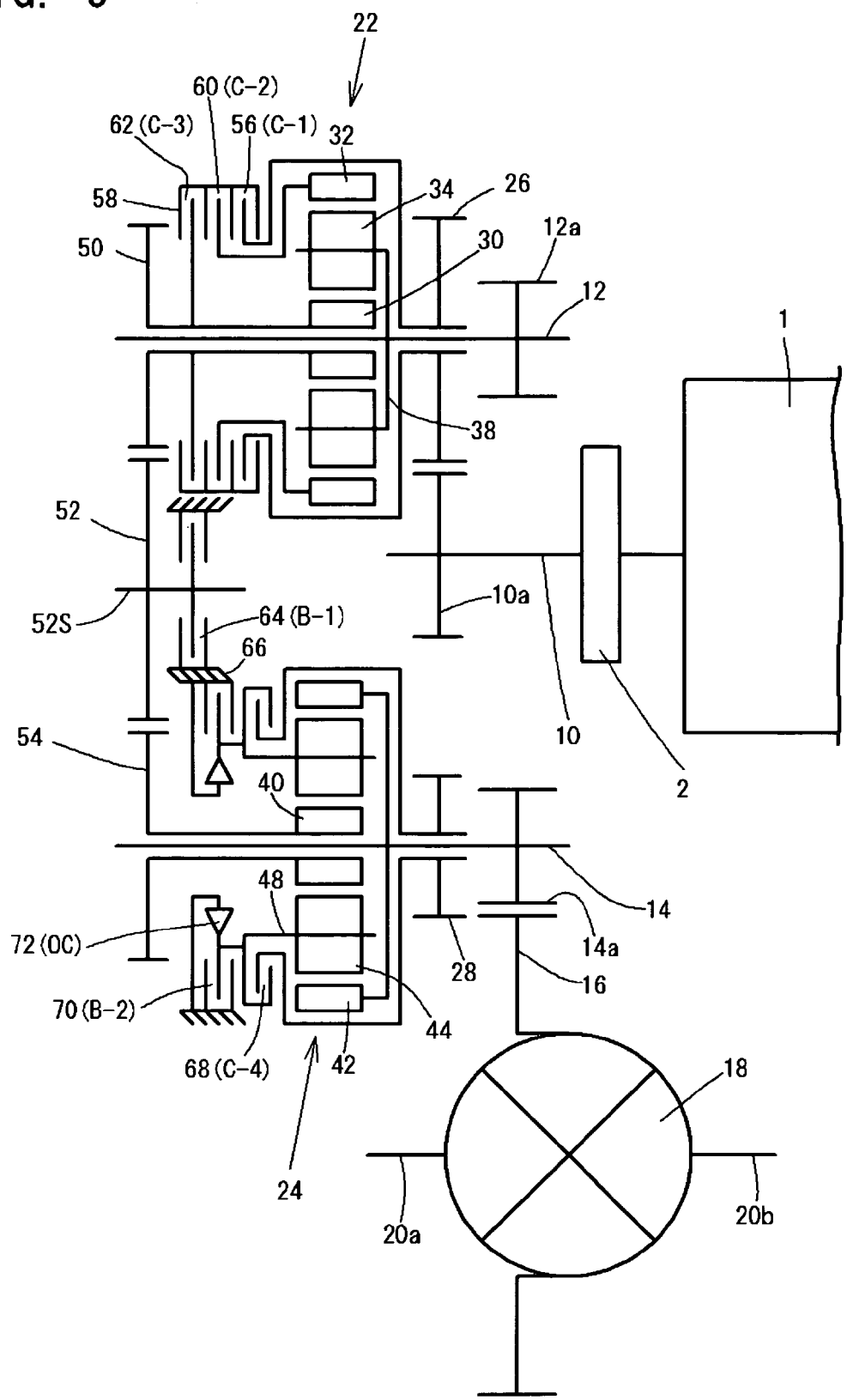
FIG. 5 is a skeleton diagram showing a gear train of a multi-speed automatic transmission of a second preferred embodiment according of the present invention.

As shown in FIGS. 5 and 6, the 7-speed automatic transmission has a construction similar to that of the first embodiment except that it has a damper 2a between a crank of an internal combustion engine 1 and an input shaft 10 and a first friction clutch 56 is operated in a way different from the first embodiment. The other parts of the second embodiments are similar to those of the first embodiment.

The operation of friction elements and a one-way clutch 72 is similar to that of the first embodiment as shown in FIG. 6, except the first clutch 56 acts as a moving-off element. Accordingly, "M" in FIG. 6 indicates application of the first clutch 56 for carrying out moving-off function.

In order to obtain a first forward speed in a D position and an L position, a second clutch 60 is engaged at first, and then the first clutch 56 is gradually engaged with its slippage and finally completely engaged. In order to obtain a reverse gear in an R position, a third clutch 62 is engaged and the second brake 70 is applied at first, then the first clutch 56 is gradually engaged with its slippage and finally completely engaged. These controls of the first clutch 56 can smoothly start a vehicle without a fluid coupling and a torque converter, which can further decrease an axial length of the automatic transmission since the damper is short in the axial direction.

While there have been particularly shown and described with reference to preferred embodiments thereof, it will be understood that various modifications may be made therein, and it is intended to cover in the appended claims all such modifications as fall within the true spirit and scope of the invention.

The entire contents of Japanese Patent Applications No. 2005-0222346 filed Aug. 1, 2005 and No. 2005-0222347 filed Aug. 1, 2005 are incorporated herein by reference.

What is claimed is:

1. A multi-speed automatic transmission for a motor vehicle comprising:
a transmission case;
an input shaft having an input drive gear;
a first output shaft having a first output drive gear at an one end portion thereof and arranged in parallel with the input shaft;
a second output shaft having a second output drive gear and arranged in parallel with the input shaft and the first output shaft;
a first input driven gear rotatable on the first output shaft and engaging with the input drive gear;
a second input driven gear rotatable on the second output shaft and engaging with the first dive gear;
an output driven gear in mesh with the first output drive gear and the second output drive gear;
a first planetary gear set interposed between the input shaft and the first output drive gear and arranged in coaxial with the first output shaft to change a rotational speed of the input shaft to a rotational speed of the first output drive gear, the first planetary gear set including a first sun gear, a first ring gear, a plurality of first pinions supported by a first pinion carrier and engaging with the first sun gear and the first ring gear; and
a second planetary gear set interposed between the input shaft and the second output drive gear and arranged in coaxial with the second output shaft to change the rotational speed of the input shaft to a rotational speed of the second output drive gear, the second planetary gear set including a second sun gear, a second ring gear, a plurality of second pinions supported by a second pinion carrier and engaging with the second sun gear and the second ring gear; wherein
the input shaft is in one of engaging and engageable relationships with the first ring gear via the input drive gear and the first input driven gear, and is in one of engaging and engageable relationships with the second carrier via the input drive gear and the second input driven gear,
the first output shaft is in one of engaging and engageable relationships with the first carrier,
the second output shaft is in one of engaging and engageable relationships with the second ring gear,
the first sun gear and the second sun gear are engaged with an intermediate gear, being capable of being held to the transmission case by a first brake arranged between the intermediate gear and the first and second planetary gear sets, and being connectable with the input shaft via the input drive gear and the first input driven gear, and
the second carrier is capable of being held to the transmission case.

2. The multi-speed automatic transmission according to claim 1,
the first input driven gear and the first ring gear are connectable with each other by engaging a first clutch and a second clutch,
the first ring gear and the first sun gear are connectable with each other by engaging the second clutch and a third clutch,
the first sun gear is connectable with the first input driven gear by engaging the first and third clutches, the second input driven gear and the second carrier are connectable with each other by engaging a fourth clutch, and the second carrier is capable of being held to the transmission case by a second brake.

3. The multi-speed automatic transmission according to claim 2, the first clutch acts as a moving-off element.

4. The multi-speed automatic transmission according to claim 3, the first clutch, the second clutch and the third clutch are connected by an intermediate member arranged in coaxial with the first output shaft.

5. The multi-speed automatic transmission according to claim 2, the first clutch, the second clutch and the third clutch are connected by an intermediate member arranged in coaxial with the first output shaft.

* * * * *